United States Patent [19]

Giller et al.

[11] 3,876,776

[45] Apr. 8, 1975

[54] PHARMACEUTICAL COMPOSITION POSSESSING ANTIPARKINSONIC ACTIVITY

[76] Inventors: Solomon Aronovich Giller, ulitsa Pernavas 10, kv. 76; Yanis Jurievich Polis, ulitsa Maškavas 266/4, kv. 38; Isaak Moiseevich Kamyanov, ulitsa Petersalas 19, kv. 47, all of Riga, U.S.S.R.

[22] Filed: Sept. 24, 1973

[21] Appl. No.: 399,799

[30] Foreign Application Priority Data
Feb. 28, 1973 U.S.S.R. ............................ 1888475

[52] U.S. Cl. ................................ 424/180; 260/210
[51] Int. Cl. ........................... A01n 9/00; A01n 9/28
[58] Field of Search ...................... 424/180; 260/210

*Primary Examiner*—Elbert L. Roberts
*Attorney, Agent, or Firm*—Holman & Stern

[57] ABSTRACT

The pharmaceutical composition possessing antiparkinsonic activity which consists of a therapeutically efficaceous quantity of 1-adamantilamino-N-glucuronide having the formula

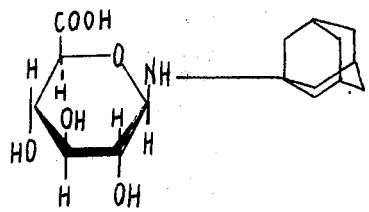

and a pharmaceutically suitable solvent or filler for peroral administration or for injections thereof.

8 Claims, No Drawings

PHARMACEUTICAL COMPOSITION POSSESSING ANTIPARKINSONIC ACTIVITY

This invention relates to a pharmaceutical composition possessing antiparkinsonic activity.

Medicinal preparations for the treatment of parkinsonism are known in the prior art. L-dopa, amantadine, and cholinolytic preparations are among them. These preparations, given per se and in combinations, have serious disadvantages.

For example L-dopa should be given in large doses but yet produces unwanted side effects.

Moreover, numerous complications develop during the course of the L-dopa therapy which are intensified with the growing daily dosage. Dyspeptic phenomena, such as nausea, vomiting, pains in the region of the stomach, are the most frequent among them. Cardiovascular malfunctions and disorders in the organ of vision are also observed. Many patients manifest psychic disorders and changes on the part of the hemopoietic system. The incidence of complications associated with the L-dopa therapy is as significant as in 90 per cent of the cases treated.

Amantadine proves ineffective in some cases and only insignificantly affects separate symptoms of the disease; for example it is of little effect with respect to decreasing tremors.

Various cholinolytic preparations, for example, artane, are known to be used for treating parkinsonism. However, like the other cholinolytic preparations, artan produces some undesirable side effects, such as: accommodation disorders, dryness in the mouth, constipation, and tachycardia. Cases were reported in which narcomania developed following the administration of artane.

The object of this invention is to prepare a new pharmaceutical composition having high antiparkinsonic activity.

Another object of the invention is to work out a new pharmaceutical composition possessing high antiparkinsonic activity and producing no side effects.

In accordance with these and other objects, the essence of the invention consists in that the pharmaceutical composition having the antiparkinsonic activity consists of the active principle 1-adamantilamino-N-glucuronide having the formula:

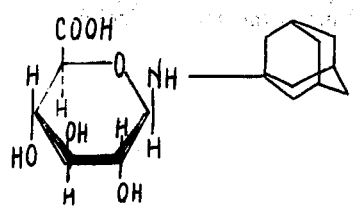

and a pharmaceutical solvent or a pharmaceutical filler.

The said compound is a white crystalline powder, soluble in water: 25 g/litre at 20°C.

The melting point of the compound is 175°–180°C, with decomposition.

The pharmaceutical filler that can be used in the form of tablets of the proposed preparation is preferably a mixture of stearic acid, milk sugar, starch (potato) and talc. The compound is prepared as described in Chemical Abstracts, 77 (5) 34856p (1972).

Furthermore, the medicinal preparation can also be dispensed in the form of dragee, capsules, troches, and suppositories.

The active principle content of the tablet can be present in from 10 to 600 mg, and preferably 200 mg.

The proposed pharmaceutical composition can be used in the form of a solution of 1-adamatilamino-N-glucuronide in distilled water.

It is recommended to use solutions containing from 10 to 600 mg of the active principle.

It is possible to use the proposed pharmaceutical composition together with cholinolytic preparations, tricyclic antidepressants, and also with preparations from the benzodiazepine group. The therapeutic activity of the complex of the pharmaceutical composition increases in this case.

The experimental study of the proposed pharmaceutical composition on animals has shown that when given intraperitoneally in doses or up to 800 mg/kg body weight, the pharmaceutical composition does not produce appreciable changes in the behaviour of albino mice. The table which follows hereinafter shows the results of the comparative study of the effect of the proposed pharmaceutical composition and amantadine on the temperature and the coordination of movements in albino mice ($P=0.05$).

Table

| Preparation | Hypothermic action | E.D. 50 mg/kg body weight Disordered coordination established | |
| --- | --- | --- | --- |
| | | by 'rotary rod' method | by 'tube' test |
| Amantadine | 75(61–93) | 64(49–83) | 70(51–97) |
| Proposed preparation (pharmaceutical composition) | 1200 | 1000 | 1050(700–1587) |

The tabulated data show that while amantadine produces hypothermic effect in doses of 75 (61–93) mg/kg, the proposed pharmaceutical composition does not produce marked a hypothermic effect even when given in doses or up to 1200 mg/kg body weight.

The new pharmaceutical composition somewhat affects the coordination of the movements of albino mice when given in doses 15 times exceeding the corresponding doses of amantadine.

The $LD_{50}$ of amantadine for albino mice is 1150 mg/kg (peroral administration), while the $LD_{50}$ for the proposed pharmaceutical composition is 15,000 mg/kg body weight. When given intraperitoneally, the $LD_{50}$ of amantadine for albino mice is 230 mg/kg. All mice, to which the proposed pharmaceutical composition containing 1-adamantilamino-N-glucuronide was given, survived. In other words, the new pharmaceutical composition given in doses five times exceeding the $LD_{50}$ of amantadine, and does not produce toxic effect in albino mice.

Unlike amantadine, the proposed pharmaceutical composition when given in doses of from 20–30 mg/kg body weight does not affect the blood pressure or respiration, nor does it produce any effect on the M-, and N-cholino-, histamino-, or adrenoreactive systems.

The results of the experiments in vivo were completely proven in clinical investigations, which are illustrated by the following examples. EXAMPLE 1

A female patient age 56, was admitted to the hospital for schizophrenia. In the course of psychopharmacological therapy a marked neuroleptic parkinsonism developed. The patient was given the proposed pharmaceutical composition for 10 days running in doses of 200 mg of 1-adamantilamino-N-glucuronide three times a day (the daily dose was 600 mg of the active principle). The symptoms of parkinsonism gradually subsided and completely disappeared by the tenth day. No side effects were observed.

EXAMPLE 2

A female patient, age 46, was admitted with diagnosis of postencephalitic parkinsonism, characterized by muscular rigidity and tremors (manifested form). The patient could not serve herself. She was given the proposed pharmaceutical composition for a month in a dose of 200 mg of 1-adamantilamino-N-glucuronide three times a day. The basic symptoms of parkinsonism subsided in the course of the therapy and disappeared completely by the end of the month. Insignificant hand tremor only persisted. The patient continues to take the preparation. No side effects were observed.

EXAMPLE 3

A male patient age 62, was admitted to the hospital for atherosclerotic parkinsonism (rigidity-tremor syndrome) in the manifested form. The patient had been confined to his bed for the greater part of each day. He was given the proposed pharmaceutical composition in a dose of 200 mg of 1-adamantilamino-N-glucuronide daily. The gravity of the parkinsonism symptoms were reduced markedly within a few days. In 30 days, the also therapy included artane, amitriptiline and seduxen. The condition of the patient improved markedly. No side effects were noted.

The proposed pharmaceutical composition was efficaceous in all cases with parkinsonism under our observation, however, the greatest efficacy of the preparation was noted with the atherosclerotic and the neuroleptic syndromes. Less efficacy was observed with Parkinson's disease and postencephalitic parkinsonism.

The proposed pharmaceutical composition does not produce side effects when given in doses of up to 600 mg of the active principle, which makes it superior to L-dopa. The proposed composition is well tolerated by patients and improves their psychic condition.

There are no contrary indications to the use of the proposed pharmaceutical composition.

The proposed pharmaceutical composition can be stored in the form of tablets or powders under normal conditions for an indefinitely long period of time.

We claim:

1. A composition possessing antiparkinsonic activity comprising an antiparkinsonic-effective amount of 1-adamantilamino-N-glucuronide having the formula

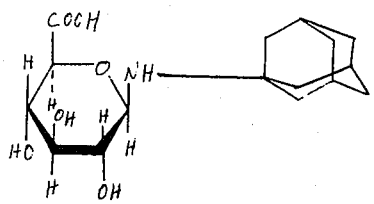

and a pharmaceutically acceptable solvent.

2. A composition having antiparkinsonic activity comprising an antiparkinsonic-effective amount of 1-adamantilamino-N-glucuronide having the formula

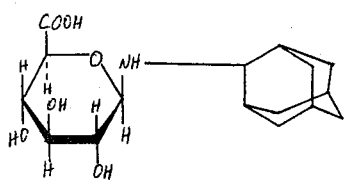

and a pharmaceutically acceptable filler.

3. A composition according to claim 1, in which distilled water is used as the solvent.

4. A composition according to claim 2, in which stearic acid, milk sugar, potato starch and talcum are used as the filler for tablets.

5. A method of treatment of patients with parkinsonism consisting of administering into the patient's body the composition according to claim 1.

6. A method for the treatment of patients with parkinsonism, consisting in administering into the body of the patient the composition according to claim 2.

7. A method according to claim 5, in which the composition is given to the patient in the form of a solution of the active principle in a quantity of from 10 to 600 mg in distilled water.

8. A method according to claim 6, in which the composition is given to the patient per os in doses of from 10 to 600 mg of the active principle.

* * * * *